(12) United States Patent
Bennett et al.

(10) Patent No.: US 6,358,593 B1
(45) Date of Patent: Mar. 19, 2002

(54) DOOR LAMINATION STRUCTURE

(75) Inventors: Grant Bennett; Douglas Smith, both of Sacramento, CA (US)

(73) Assignee: American Building Supply, Inc., Sacramento, CA (US)

(*) Notice: Subject to any disclaimer, the term of this patent is extended or adjusted under 35 U.S.C. 154(b) by 0 days.

(21) Appl. No.: 09/549,626

(22) Filed: Apr. 14, 2000

(51) Int. Cl.[7] .................................................. B32B 3/02
(52) U.S. Cl. .......................... 428/76; 428/68; 428/125; 428/126; 52/792.1; 52/784.1; 52/232
(58) Field of Search ................................. 428/125, 126, 428/121, 68, 76, 192; 52/792.1, 784.1, 800.1, 232; 49/501

(56) References Cited

U.S. PATENT DOCUMENTS

| | | | | |
|---|---|---|---|---|
| 670,939 A | * | 4/1901 | Rapp | 52/784.1 |
| 3,750,333 A | * | 8/1973 | Vance | 49/501 |
| 4,649,089 A | * | 3/1987 | Thwaites | 52/232 |

* cited by examiner

Primary Examiner—Alexander S. Thomas
(74) Attorney, Agent, or Firm—Theodore J. Bielen, Jr.

(57) ABSTRACT

A door lamination structure including a core member with first and second surfaces separated by an endless edge third surface. A groove extends around the endless third surface and forms a chamber in the core. First and second sheets of protective material are placed over the first and second surfaces respectfully. A fastener holds the first and second sheets to the chamber of the groove.

7 Claims, 2 Drawing Sheets

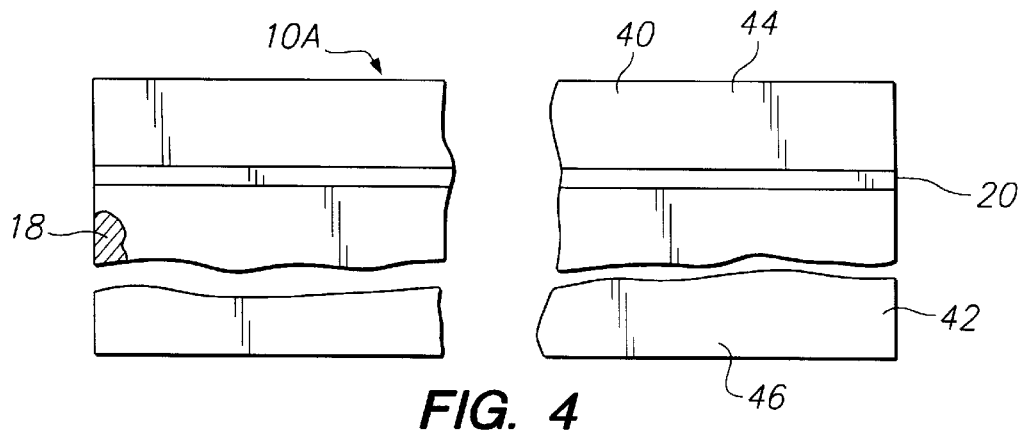
FIG. 4
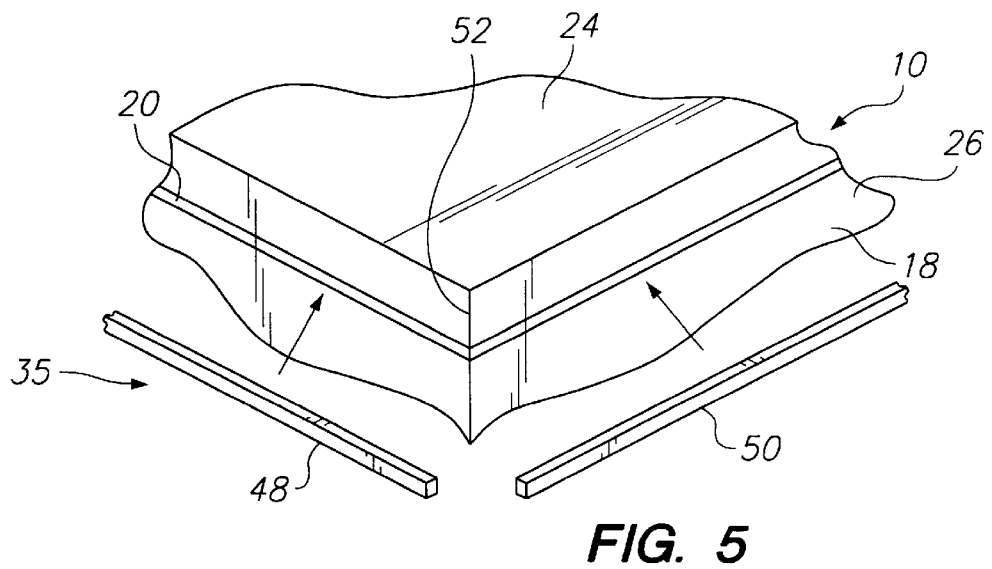
FIG. 5
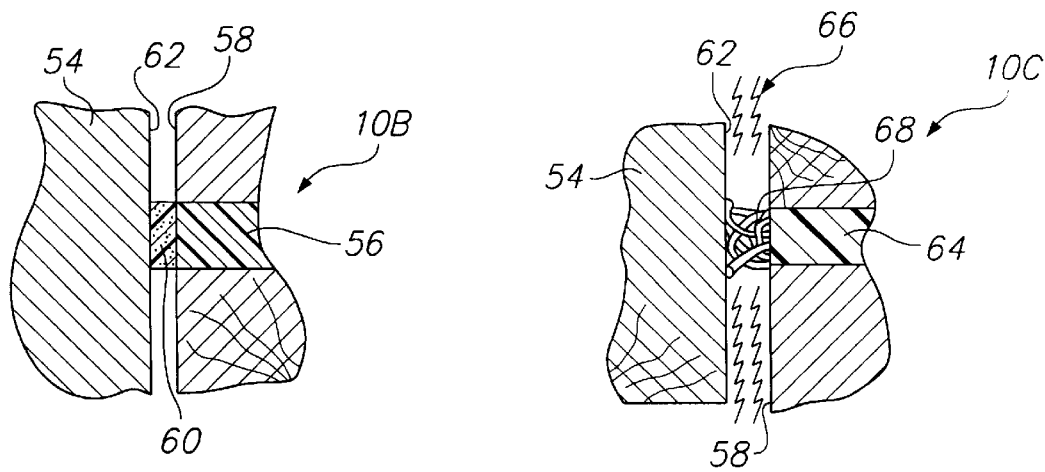
FIG. 6   FIG. 7

DOOR LAMINATION STRUCTURE

BACKGROUND OF THE INVENTION

The present invention relates to a novel and useful door lamination structure.

Non-metallic doors are normally formed from wood and plastic materials. Doors of this type must be finished to protect the non-metallic core and to produce a desired finish which has aesthetic appeal. For example, many door cores are painted with oil or water based paints. Unfortunately paints are a major source of air pollution, the use of which is closely monitored by air quality authorities in many jurisdictions. Volatile organic components in paints (VOCs) are calculated cumulatively to create limits in their use. Needless to say, the use of the paints when manufacturing doors can prove extremely costly when the avoidance of air pollution is factored in to the total cost of such an operation.

Plastic films have been vacuum formed over door cores, but the application of such films has resulted in formation of butt joints at corners of the door structure. In many cases, such butt joints are not acceptable from an appearance standpoint. Although molding has been employed to cover unsightly joints, such a solution is expensive and labor intensive. A door lamination structure which is capable of using film material to produce an aesthetic and adequately protected door surface would be a notable advance in the building materials field.

BRIEF SUMMARY OF THE INVENTION

In accordance with the present invention a novel and useful door lamination structure is herein provided.

The door lamination structure of the present invention utilizes a core member which may be of a wood, plastic, ceramic, or other generally non-metallic materials. The core includes a first surface and a second surface opposite to the first surface. The first and second surfaces generally serve the as front and back of the door. An endless third surface is positioned between the first and second surfaces and normally lies against a doorframe when the door is installed. A groove is formed in the endless third surface between the first and second surfaces. The groove extends at least partially about the endless third surface. An open chamber or recess in the core is formed by the groove.

A first sheet of protective material is placed over the first surface of the core such that a portion of the first sheet lies over the endless third surface of the core. Likewise, a second sheet of protective material is placed over the second surface to also overlap the endless third surface. The edges of the first and second sheets terminate in the groove. Fastening means is employed for securing the first and second sheets to the chamber of the groove. Such fastening means may take the form of a spline or other continuous member which locks the edges of the first and second sheets to the groove chamber. Thus, when the spline is placed in the groove along the endless third surface of the door, a closed chamber is formed. The edges of the first and second sheets may lie within the chamber formed by the groove in overlapping fashion. Thus, the wall of the groove and the second sheet of material would lie on either side of the first sheet of material within the chamber formed by the groove. At this point, the protective sheets are vacuum formed or glued under the influence of heat to the core of the door.

The spline, which serves as the fastening means, may lie flush with the endless third surface. In certain cases, the spline may lie below the endless third surface. Moreover, the spline may extend from the groove outwardly from the endless third surface to form a seal such as a weather stripping between the door and the frame of the door when the door is in that position relative to the frame. The spline, thus, forms a heat barrier. In certain cases, the spline may be constructed of intumescent material which would form a smoke barrier in the case of a fire. Of course, such intumescent material would expand into a position which extends completely around the door core.

In certain designs, the first and second sheets of material may include surfaces which are visible when the laminated door is completed, that are each of a different characteristic. That is to say, the first sheet of material may be of a certain color, while the second sheet of material may be of a different color or of a different surface characteristic. In any case, the finished structure of the door of the present invention would provide a rounded or "eased" edge at the corners at both sides of the door.

It may be apparent that a novel and useful door structure has been heretofore described.

It is therefore an object of the present invention to provide a door lamination structure which eliminates on unaesthetic joints between film laminations at the edge portions thereof.

It is another object of the present invention to provide a door lamination structure which eliminates painting and the burden and expenses involved in controlling air pollution sources by the use of paints.

A further object of the present invention is to provide a door lamination structure which provides superior protection to a door core and exhibits aesthetic appeal.

Another object of the present invention is to provide a door lamination structure in which a pair of sheets of protective material terminate in a groove around the edge portion of the door and are held at that position by a spline which may also serve as weather stripping.

A further object of the present invention is to provide a door lamination structure which is capable of providing a smoke barrier in the event of a fire.

Another object of the present invention is to provide a door lamination structure which is relatively simple to manufacture and assemble.

The invention possesses other objects and advantages especially as concerns particular characteristics and features thereof which will become apparent as the specification continues.

BRIEF DESCRIPTION OF THE SEVERAL VIEWS OF THE DRAWING

FIG. 4 is a broken side elevational view showing dissimilar sheets of materials used on the same door core.

FIG. 5 is a perspective view indicating the assembly of a pair of locking strips on two sides of a door overlapped by a pair of sheets of material.

FIG. 6 is a sectional view showing the fastening means or spline extending from the groove of the door core to function as weather stripping.

FIG. 7 is a sectional view of the fastening means in the form of a spline which is formed of intumescent material which has expanded under the influence of heat.

For a better understanding of the invention reference is made to the following detailed description of the preferred embodiments thereof which should be referenced to the prior described drawings.

DETAILED DESCRIPTION OF THE PREFERRED EMBODIMENTS OF THE INVENTION

Various aspects of the present invention will evolve from the following detailed description of the preferred embodiments thereof which should be taken in conjunction with the heretofore described drawings.

Figure 1:
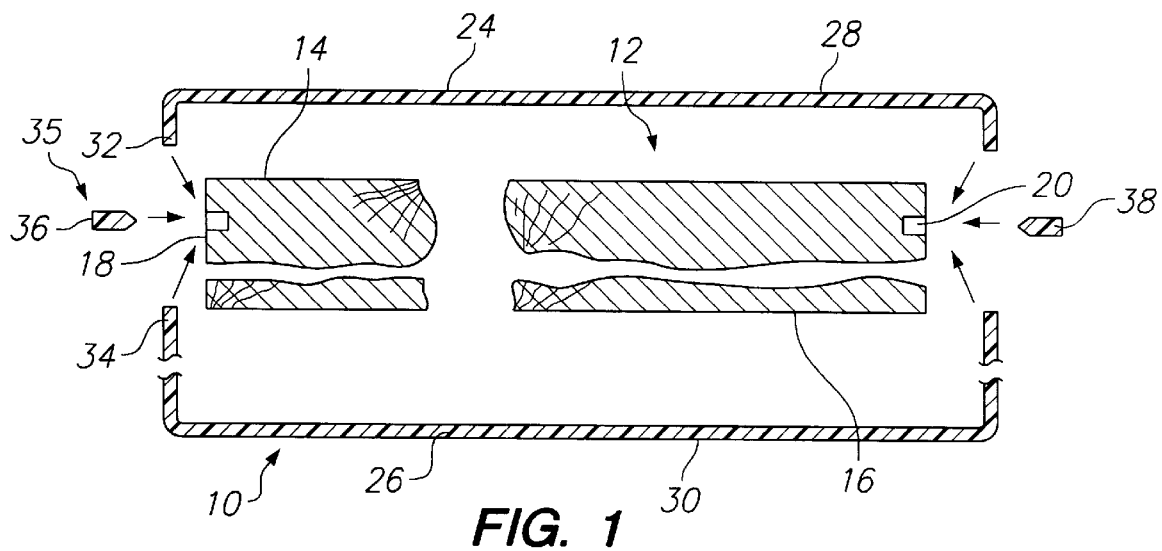
FIG. 1 is a sectional view of a door core and the protective sheets forming the lamination structure in exploded configuration.

The invention as a whole is shown in the drawings by reference character 10. First structure 10, FIG. 1, is depicted in exploded configuration. Door structure 10 includes as one of its elements a core 12. Core 12 may be composed of any common material such as metal, plastic, plywood, particle board, and the like. In any case, core 12 requires a finish for the sake of protection and appearance. Core 12 includes a first surface 14 and a second surface 16, which generally form the front and back of door 10 when mounted within a doorframe in its finished condition. An endless third surface 18 positions between first and second surfaces 14 and 16, respectively. Endless third surface 18 may be considered the edge of door 10 in its finished condition.

Groove 20 is cut into third surface 18 and essentially extends completely around core 12. Groove 20 is shown as being square-cut, however other cross-sectional shapes may be employed in this regard. Groove 20, thus, forms an open chamber 22 around core 12. It should be noted that groove 20 does not lie midway between surfaces 14 and 16, but is placed toward surface 16 to permit room for hinge or strike mortising of surface 18 without interfering with groove 20.

Referring again to FIG. 1, it may be observed that a first sheet of protective material 24 is placed over first surface 14 of core 12. A second sheet of protective material 26 is placed over second surface 16 or core 12. Portions of first and second sheets of protective material 24 and 26, respectively, extend along third surface 18. Protective sheets 24 and 26 may be composed of any suitable material such as vinyl plastic (PVC), and the like. As depicted in FIG. 1, outer surface 28 of protective sheet 24 and outer surface 30 of protective sheet 26 includes a finish which may be of a certain color or texture.

Figure 2:
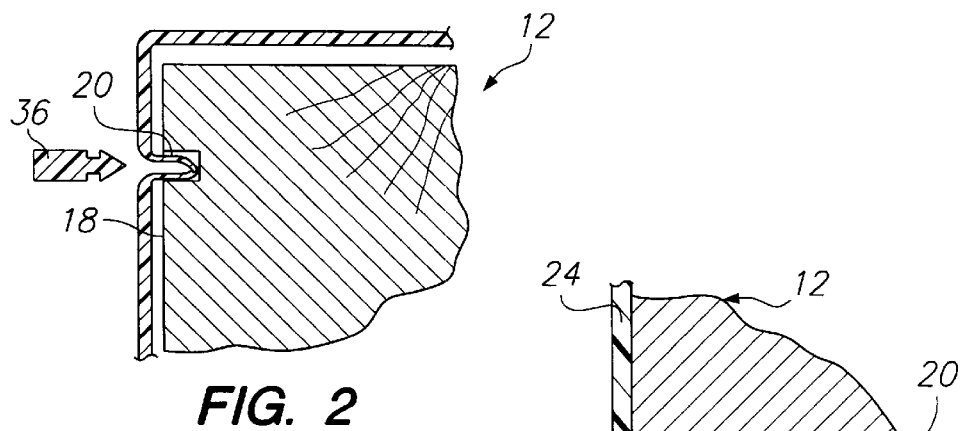
FIG. 2 is a sectional view of a portion of the door core showing the assembly of the edges of sheets of material and a locking strip.
Figure 3:
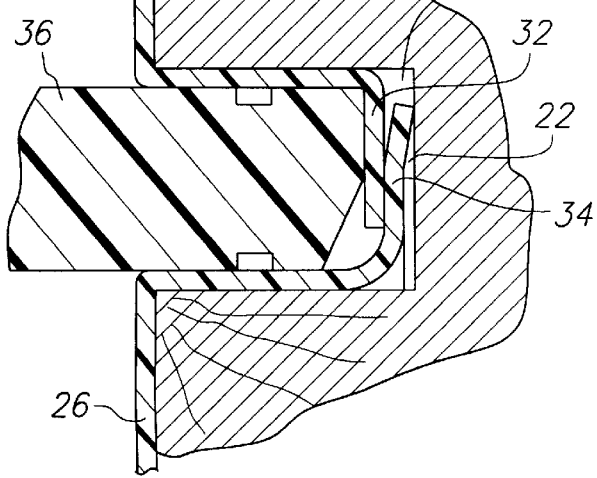
FIG. 3 is a sectional view of the groove formed in the door core and the relationship of the fastening means and sheets of materials with in the chamber of the groove.

Referring now to FIGS. 1–3, it may be seen that edge 32 of protective sheet 24 and edge 34 of protective sheet 26 are placed in continuous groove 20, within chamber 22 thereof. Fastening means 35 is employed to hold first and second sheets 24 and 26 within chamber 22. With reference to FIG. 1, it may be apparent that splines 36 and 38 are employed in this regard. Splines 36 and 38 are capable of locking within groove 20.

Referring now to FIG. 3, chamber 22 is a closed chamber due to spline 36 being positioned in groove 20. Protective sheets 24 and 26 are applied to core 12 in a conventional vacuum-forming manner by the use of glue and heat, combined with a vacuum application to hold sheets 24 and 26 to core 12. Edge 32 of protective sheet 24 and edge 34 of protective sheet 26 overlap one another within chamber 22. This structure provides protection against moisture infiltrating between protective sheets 24 and 26 and core 12. In addition, any fraying of edges 32 and 34 is eliminated. Further, "draw-back" protection is afforded to stretched protective sheets 24 and 26 when they are constructed of vinyl plastic. Thus, although edges 32 and 34 may tend to separate within chamber 22, the overlapping configuration maintains a nesting seal in combination with spline 36.

With reference to FIG. 4, a completed door 10a is depicted in which a protective sheet 40 has been used in combination with a protective sheet 42. Outer surface 44 protective sheet 40 possesses a different surface characteristic than outer surface 46 of protective feed 42. For example, outer surface 44 may be a smooth white finish while outer surface 46 may take the look of marble or granite.

Fastening means 35 may take the form of a continuous spline. However, individual splines such as splines 48 and 50 may be employed and butted at each corner, such as corner 52. Such butt joint may be easily blended with corner 52.

A further aspect of the invention is represented by FIGS. 6 and 7. Door frame 54 is shown in section with a portion of embodiments 10b and 10c of the door of the present invention. As depicted, in FIG. 6, spline 56 may lie flush with the surface 58 of door 10b. In addition, spline 56 may extend outwardly from surface 58 with an integral piece of material 60, which may take the form of weather stripping or similar seal. Needless to say, portion of material 60 fits snuggly against surface 62 of door frame 54 to form a heat seal. FIG. 7 shows another embodiment 10c of the door of the present invention in which a spline 64 is employed and is composed, at least in part, of intumescent material. That is to say, the application of a certain degree of heat represented by plurality of zigzag lines 66, will cause intumescent spline 64 to dramatically expand depicted by expansion portion 68. Thus, door 10c would now provide a smoke barrier in the case of a fire.

In operation, door 10 is assembled by utilizing a core 12 and protective sheets 24 and 26. The edges 32 and 34 of protective sheets 24 and 26, respectively, fit into a groove 20 cut in edge surface 18 completely around door core 12. Fastening means 35 is then used in the form of a spline or a plurality of splines, such as splines 36 and 38 of FIG. 1 or splines 48 and 50 of FIG. 5. The edges 32 and 34 of protective sheets 24 and 26, respectively, are overlapped within a chamber 22 formed in groove 20 to prevent fraying and to allow "draw-back" of the stretched protective sheets 24 and 26. The resulting door structure 10, 10A, 10B, or 10C provides an "eased" or rounded edge on the finished door structure and is quite durable. Protective sheets 24 and 26 may include outer surfaces 28 and 30 which are different from one another, providing variation in appearance as desired. Moreover, splines, such as splines 56 and 64 of FIGS. 6 and 7 may be composed of materials that provide heat or smoke barriers in certain situations. be composed of materials that provide heat or smoke barriers in certain situations.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A door structure, comprising:
   a. a core member, said core member including a first surface, a second surface and an endless third surface positioned between said first and second surfaces;
   b. a groove extending at least partially about said endless third surface, said groove including a chamber in said core;

c. a first sheet of protective material placed over said first surface of said core and a portion of said endless third surface of said core;

d. a second sheet of protective material placed over said second surface of said core and a portion of said endless third surface of said core, said groove including a wall and portions of said first and second sheets lie within said chamber, said portion of said first sheet within said chamber interposing said portion of said second sheet within said chamber; and e. fastening means for securing said first and second sheets to said chamber of said groove, said fastening means comprising a spline sized to extend into said groove to overlie said chamber and said interposed portions of said first and second sheets permitting draw-back of said interposed portions of said first and second sheets along said wall of said groove.

2. The structure of claim 1 in which said spline lies flush with said endless third surface.

3. The structure of claim 1 in which said spline lies below said endless third surface.

4. The structure of claim 1 in which said spline extends from said groove outwardly form said endless third surface.

5. The structure of claim 4 in which said door is mounted to a doorframe and said spline engages said doorframe to provide a heat barrier.

6. The structure of claim 1 in which said spline is constructed of intumescent material.

7. The structure of claim 1 in which said first sheet of protective material includes a visible surface possessing a different appearance than a visible surface of said second sheet of protective material.

\* \* \* \* \*